Aug. 7, 1951            E. H. LAND            2,563,343

PHOTOGRAPHIC APPARATUS

Filed Feb. 7, 1948                          3 Sheets-Sheet 1

Edwin H. Land
INVENTOR

BY Donald L. Brown
and
Oliver W. Hayes
Attorneys

Aug. 7, 1951  E. H. LAND  2,563,343
PHOTOGRAPHIC APPARATUS
Filed Feb. 7, 1948  3 Sheets-Sheet 2

Edwin H. Land
INVENTOR

BY Donald L. Brown
and
Oliver N. Hayes
Attorneys

Aug. 7, 1951  E. H. LAND  2,563,343
PHOTOGRAPHIC APPARATUS
Filed Feb. 7, 1948  3 Sheets-Sheet 3

Edwin H. Land
INVENTOR

BY Donald L. Brown
and Oliver W. Hayes
Attorneys

Patented Aug. 7, 1951

2,563,343

UNITED STATES PATENT OFFICE 2,563,343

PHOTOGRAPHIC APPARATUS

Edwin H. Land, Cambridge, Mass., assignor to Polaroid Corporation, Cambridge, Mass., a corporation of Delaware Application February 7, 1948, Serial No. 6,841

23 Claims. (Cl. 95—13)

This application relates to photography and in particular to a novel photographic apparatus adapted for processing an exposed photosensitive sheet material. More particularly the present invention relates to improved photographic apparatus, such as a camera, which is suitable for accomplishing a predetermined processing of an exposed photosensitive sheet by providing on one surface of the exposed photosensitive sheet a thin layer of liquid capable of accomplishing said processing.

It is a principal object of the invention to provide such an apparatus which is particularly adapted for use with a novel disposable liquid container, said apparatus preferably spreading the liquid between the photosensitive sheet and another sheet.

Another object of the invention is to provide an apparatus of the above type particularly adapted for handling processing liquids which are readily oxidizable in such a manner that undesired oxidation of the processing liquid is kept to a minimum, by allowing said liquid to be contacted by air for only a short period of time prior to its inclusion between the two sheets.

Still another object of the invention is to provide such an apparatus particularly adapted for photocopy work wherein it is desirable to produce a large number of copies utilizing rolls of photosensitive sheet material and rolls of positive image-receiving sheet material, such an apparatus being capable of either continuous or intermittent operation, and wherein said apparatus includes means for feeding the liquid in timed relation to the travel of the two sheets.

These and other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

In general the invention comprises a photographic apparatus for accomplishing a predetermined processing of a sheet, which sheet includes a photosensitive stratum, by providing on said sheet a layer of liquid capable of accomplishing said processing. The apparatus preferably comprises means for positioning a supply of said photosensitive sheet material, means for positioning a supply of another sheet material, and means for guiding said two sheet materials from their respective supplies to a position where said sheet materials are in superimposed relation. These guiding and superimposing means preferably comprise a pair of surfaces between which and with respect to which the sheets are adapted to move in superimposed relation with a liquid-receiving space therebetween. There are also provided means for feeding a predetermined quantity of processing liquid to said sheet materials, the liquid-feeding means being so positioned with respect to the means for superimposing the sheets that the liquid does not contact the superimposing means. The apparatus also preferably includes means, preferably the superimposing means, for predeterminedly controlling the thickness of the liquid-receiving space between said sheet materials so as to predetermine the thickness of the layer of liquid confined between adjacent faces of said sheet materials. The liquid-feeding means preferably includes a liquid supply, a discharge means such as a nozzle from which said liquid is discharged for movement towards said liquid-receiving space, and means for supporting and reciprocating said nozzle across said sheets as they are superimposed.

In one preferred form of the invention, the superimposing means are so arranged that as the sheets converge into superimposition they provide a V-shaped liquid-holding space converging to an apex communicating with the liquid-receiving space between the sheets. In the preferred form of the invention the nozzle discharges its liquid directly into this liquid-holding space. The speed of movement of the nozzle, the flow of liquid therefrom, and the duration of flow is preferably so adjusted that the amount of liquid deposited at one stroke of the nozzle is only sufficient to cover, with a predetermined thickness of liquid, an area of said sheet having a dimension longitudinal of said sheet less than the transverse dimension of the sheet along which said liquid is fed. In another form of the invention the liquid is applied as a ribbon to one of the sheets just prior to the passage of this sheet adjacent the liquid-holding space and into superimposition with the other sheet, the ribbon of liquid being spread over a predetermined area of the two sheets as they are superimposed. In this case the ribbon of liquid is brought into, and held in, the liquid-holding space until it is withdrawn by the sheets defining and passing by this space. Thus, in both cases, the liquid fed from the nozzle is used up almost immediately and is thereby subject to only negligible oxidation prior to inclusion between the two sheets.

There is also preferably included an indicating or liquid-gauging means which is rendered operative by a predetermined quantity of liquid in said liquid-holding space. There are also provided means for causing a flow of said liquid from said supply. The indicating means is preferably capable of effecting either the reciprocating means, the flow control means or the flow causing means to prevent further flow of, or to reduce flow of, said liquid when the liquid in said liquid-holding space reaches a predetermined amount. For accomplishing this purpose, the indicating or liquid-gauging means is preferably positioned adjacent the marginal ends of the liquid-holding space and is so related to this space that liquid tending to flow beyond the ends of the space renders the indicating means operative to reduce or stop further flow of liquid.

There may also be provided a means for wiping excess liquid from the nozzle and a further means for moving the wiping means so as to present a fresh wiping surface to said nozzle.

Figures 1, 2:
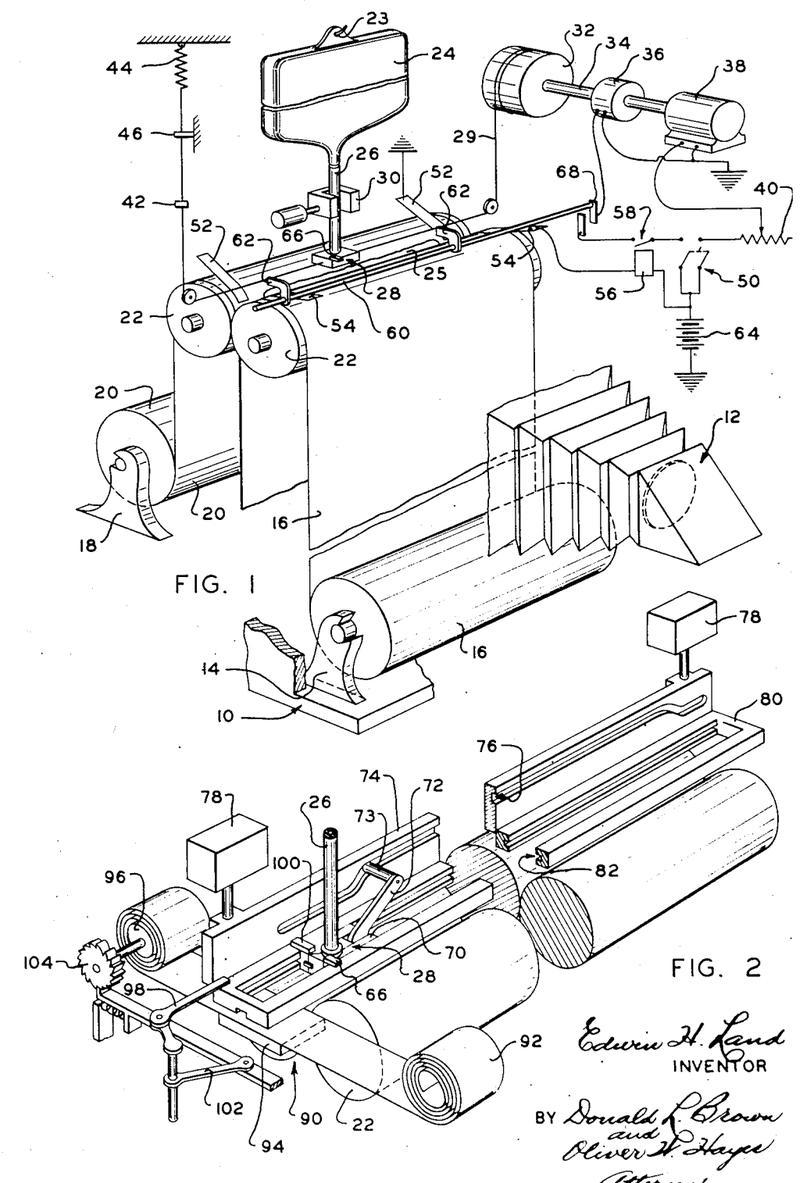
Figure 1 is a diagrammatic fragmentary perspective view of one preferred modification of the invention.
Fig. 2 is a diagrammatic fragmentary perspective view of another form of the invention.

Referring now to Fig. 1, there is shown a diagrammatic fragmentary perspective view of one preferred form of the invention as embodied in a device such as a photocopy camera. This camera comprises a housing 10 carrying a lens and shutter assembly schematically indicated at 12. Secured to one portion of housing 10 is a means 14 for holding a roll of photosensitive sheet material 16. Secured to another portion of the housing is a means 18 for holding a roll of another sheet material 20, this other sheet material preferably comprising a positive image-carrying sheet adapted to receive a positive image of a latent negative image recorded by exposure of the photosensitive layer. For guiding the exposed photosensitive sheet 16 into superimposition with the positive image-carrying sheet 20 there is provided a superimposing means which is shown in the preferred form as comprising a pair of pressure rolls 22.

At 24, there is indicated a supply of the processing liquid 25, this liquid being preferably viscous and preferably containing a developer and/or other processing reagent. This supply 24 is preferably held by a support 23 so that liquid flows by gravity therefrom through a discharge means shown, in the preferred form, as a nozzle 26. For supporting the nozzle 26 in a predetermined relation to the sheets as they are superimposed there is provided a means 28 which is reciprocated lengthwise of the liquid-holding space formed by the two converging sheets 16 and 20. Support means 28 is preferably suitably hinged so as to facilitate introduction therein of nozzle 26. A valve, schematically indicated at 30, is preferably provided for controlling flow of liquid from nozzle 26. For furnishing a reciprocating motion to support 28, there are provided a pair of means generally indicated at 32 and 44, these means being connected, such as by a flexible cable 29, to each other and to the support 28. A means for moving the support 28 to the left is shown schematically as comprising a spring 44. Associated with this spring 44 is an adjustable stop 46 which cooperates with a lug 42, for example, carried by cable 29 to control the extent to which spring 44 may pull the cable 29 to the left. Since stop 46 is adjustable, it may be used for controlling the left-hand limit of travel of the support 28.

Reciprocating means 32 comprises a drum to which cable 29 is attached. For rotating the drum 32, there is provided a shaft 34 connected to a suitable power source such as a motor 38 through a means such as a magnetic clutch 36. As shown, motor 38 is operated by a power source such as a battery 64, there being one switch 50 and a variable resistance 40 between the battery and the motor. Switch 50 is normally closed upon starting the apparatus. The magnetic clutch 36 is connected to power source 64 through two switches 58 and 68, in addition to switch 50. Switch 68 is controlled by a movable switching bar 60 having a pair of adjustable lugs 62 mounted thereon.. These lugs are preferably engaged by a means such as another lug 66 mounted on support 28. With such an arrangement, movement of support 28 to the left under influence of spring 44 causes lug 66 to engage the left-hand lug 62 and move the switching bar 60 to the left, thus closing switch 68. Engagement of lug 66 with right-hand lug 62 opens switch 68 by moving the switching bar to the right. Switch 58 is normally closed and is opened by current passing through solenoid 56, which current is created as the result of the energization of a liquid-gauging or indicating means by processing liquid 25. In one preferred form, this indicating means comprises two pairs of contacts 52—54 which are positioned at marginal ends of the liquid-holding space defined by the two converging sheets to be processed. These pairs of contacts 52—54 are preferably connected in a parallel circuit, only the right-hand circuit being shown. The contacts 52 and 54 are preferably stainless steel metallic strips pressed against the edges of the two sheets being superimposed. In the normal use of the apparatus, these contacts do not touch the processing liquid. However, when an excess of liquid exists within the liquid-holding space it tends to overflow towards the edges of the sheets. As this happens, it creates an electric connection between the two contacts and thus operates the solenoid 56 to open the switch 58.

In the operation of the above-described reciprocating means 32 and 44, the nozzle support 28 is normally urged to the left, as shown in Fig. 1, by spring 44. When switch 50 is closed to start the apparatus, motor 38 starts to rotate and magnetic clutch 36 is energized, thereby connecting motor 38, through shaft 34, to drum 32 and creating a tension on cable 29, thus moving support 28 to the right. During this movement, rheostat 40, associated with the motor 38, controls the speed of support 28. When support 28 reaches a predetermined right-hand position, lug 66 engages right-hand lug 62, thus opening switch 68, clutch 36 is disengaged and the support 28 moves back rapidly. In a preferred form of the invention, valve 30 can be a solenoid valve which is normally closed and which opens whenever magnetic clutch 36 is energized. Thus the solenoid valve 30 may be placed in parallel with magnetic clutch 36. When support 28 is moved sufficiently to the left by spring 44, lug 66 engages left-hand lug 62, thus moving switching bar 60 to close switch 68 and thus reengage clutch 36, thereby starting the cycle over again.

The viscous liquid 25 is preferably fed to the liquid-holding space within boundaries slightly narrower than sheets 16 and 20, and thus short of the two pairs of electrodes 52—54, the stroke of movement of the support 28 being limited, as previously described, by means of the stop lugs 62 on the switching bar.

In the use of the device shown in Fig. 1, a roll of photosensitive sheet material 16 is placed in the holder 14 and a roll of the positive sheet 20 is placed in the holder 18. Both of these sheets are then fed between pressure rolls 22 and the camera is made light-tight. Exposure is then made by operating the shutter 12. The rolls 22 are operated, thus moving an exposed frame of photosensitive sheet from exposure position into superimposition with positive sheet 20. Coincidentally with the rotation of rolls 22, switch 50 is closed, causing support 28 to be moved to the right. Shortly thereafter, opening of switch 68 causes the spring 44 to bring support 28 back to the left. The liquid 25, with the above-described construction, is fed from nozzle 26 on the right-hand stroke of the nozzle since valve 30 is opened, but no liquid is fed on the left-hand stroke since valve 30 is closed. When properly adjusted, the above cycle of operation gives a flow of liquid sufficient to maintain the liquid-holding space filled to a predetermined level and the liquid is removed from this space just as fast as it is fed thereto.

Rolls 22 are preferably so mounted that as the sheets 16 and 20 pass therebetween there exists a liquid-receiving space between the sheets. This space is created, in the preferred form of the invention, by providing a space between the two rolls slightly greater than the combined thickness of the two sheets. In other forms of the invention, this space may not exist in the static condition of use of the device, but may be created by the pressure of the viscous liquid passing between the sheets, thus causing the separation of the rolls or of resilient surfaces thereof. The amount of liquid in the liquid-holding space at any one time is preferably kept quite small so that the total time any portion of the liquid is subject to oxidation is kept to a minimum. If too little liquid is being fed from the nozzle, rheostat 40 may be adjusted to increase the time of the right-hand stroke, while if too much liquid is being fed, rheostat 40 is adjusted to speed up the stroke. Whenever the liquid gets too high in the liquid-holding space, due to maladjustment, it starts to expand towards the ends of the space where it renders the indicating means operative by shorting out the contacts 52—54. This results in an opening of switch 58, thus deenergizing clutch 36 and preferably also solenoid valve 30. The indicating means 52—54 can also act to just deenergize valve 30 so that there is no feed from nozzle 26 even though this nozzle continues to reciprocate. It is also possible, but less preferred, to have the indicating means 52—54 operate to lower the support 23 which holds the liquid supply 24, thus removing the effect of gravity which previously caused flow of the liquid from the nozzle. In those cases where pressure by gas, a weight, or a spring is applied to the surface of the liquid or to the liquid supply, the indicating means 52—54 may be actuated to deenergize these means for causing the liquid to flow.

As the two sheets 16 and 20 pass between the rolls 22, they are laminated together by the thin layer of processing liquid 25, these sheets being maintained in this lamination until such time as the desired processing has been accomplished. The sheets are then separated, either within or outside of the camera. In the preferred form of the camera, a take-up spool is provided for winding up the processed negative and, when the other sheet carries a finished positive image, this sheet is discharged from the camera through a suitable light-tight opening by means of suitable advancing rolls. In those cases where both sheets 16 and 20 include light-opaque strata, the sheets may be discharged directly after lamination by the processing liquid and the processing may take place outside of the camera.

The exposure of the photosensitive layer is preferably synchronized with the movement of the photosensitive sheet 16, exposure of a predetermined area thereof being made when this area is within the focal plane of the camera. For accomplishing this exposure, the rolls 22 may be intermittently driven or the lens system may be so designed as to permit exposure of sheet 16 while it is moving. Also an additional advancing means for intermittently advancing the photosensitive sheet may be provided. Such additional advancing means may comprise rolls or sprockets and the processing rolls 22 may be continuously driven. Equally, the material to be copied may be fed in contact with the photosensitive sheet past a suitable light source.

While one preferred form of means for reciprocating support 28 has been shown, these means may be considerably modified without departing from the scope of the invention. For example, the drum 32 may have both ends of cable 29 secured thereto, thus winding up one end of the cable while it unwinds the other end. With such a form of the invention, the drum may be rotated in one direction by the motor 38, as described, and rotated in the other direction by a suitable spring connected to the drum. Equally, with this latter modification of the invention, the motor 38 may be periodically reversed either by switching bar 60 or by other means. Alternatively, the clutch 36 can be a reversing clutch which may be suitably actuated by the switching bar, for example.

In still another form of the invention, the separate power source, such as motor 38, may be eliminated and the power may be taken from the rolls 22. In this latter modification, the drum 32 can be driven at a fixed speed with respect to rolls 22 or its speed may be varied by providing a variable drive between rolls 22 and the drum 32. In those cases where it is desirable to drive the drum 32 at a constant speed, the valve 30 may be adjusted, when desired, by using a selsyn or other type of controllable valve in place of, or in addition to the simple cut-off valve indicated at 30. Additionally, the two liquid-gauging or indicating means, comprising the pairs of contacts 52—54, may be made adjustable in accordance with the adjustment of the stroke of the support 28. Thus, the apparatus may be adapted for use with sheets of various widths and the pairs of contacts 52—54 may be adjusted so that even with narrow widths the liquid is not permitted to contact the rolls 22.

Figure 3:
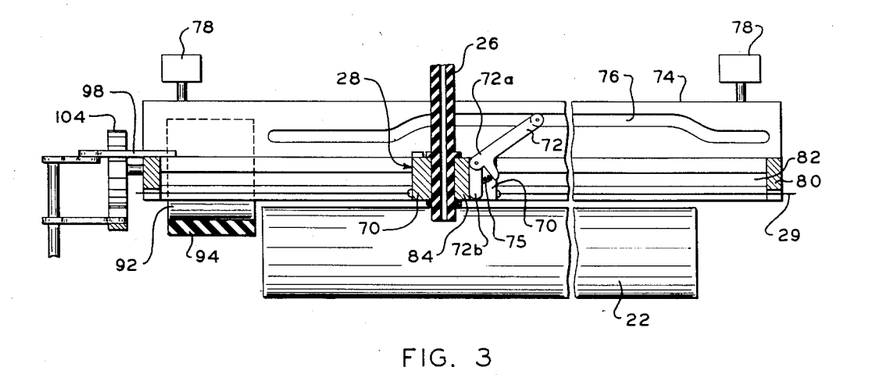
Fig. 3 is a fragmentary sectional view of Fig. 2, the section being in a plane approximately normal to a plane which is tangent to both rolls 22, the section plane passing between the rolls.
Figure 4:
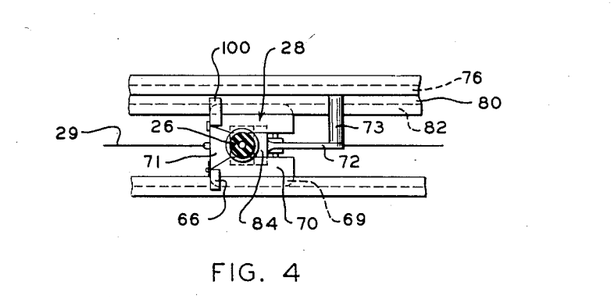
Fig. 4 is a fragmentary plan view of Fig. 2.

Referring now to Figs. 2 to 4, there is shown another form of the invention wherein like numbers refer to like elements of Fig. 1 and wherein certain elements such as the sheets 20—22, cable 23, switching bar 60, reciprocating means 32, 44, and indicating means 52—54, have been omitted for simplicity of illustration. As seen in these figures, the support 28 for the nozzle 26 comprises a block 70, one portion of which is movable with respect to the other portion, this latter portion being indicated at 84. Also, a suitably hinged portion 71 (Fig. 3) may be provided to permit ready introduction of nozzle 26. Portion 84 is moved by means of an arm 72, pivotally secured to 70 and having a cam follower extension 73 at the end thereof. Arm 72 preferably comprises two portions 72a and 72b (shown in Fig. 3), concentrically pivotally mounted and connected together by a strong spring, schematically indicated at 75, which allows the top part 72a of the arm 72 to move even after the bottom portion 72b of the arm can no longer move. The cam follower 73 is controlled by a cam groove 76 carried by a cam plate 74. For controlling the vertical position of cam plate 74, there are preferably provided a pair of means schematically indicated at 78, these means being solenoids or other suitable adjusting means such as screw-threaded supports. For carrying the support 28, there is provided a track 80 having grooves 82 therein on which ride suitable shoulders 69 extending from block 70. In addition to the elements previously described, there is also shown a means for wiping excess liquid from the end of the nozzle 26 when the nozzle reaches the left-hand end of the stroke. These wiping means are indicated generally at 90 and comprise a roll of wiping material 92, such as paper, which is suitably supported. The paper 92 extends across a resilient backing, indicated at 94, to a spindle 96 on which it is adapted to be wound. A preferred means for rotating spindle 96 comprises a contact 98 adapted to be engaged by a lug 100, carried by the support 28, and linkage 102 which transmits the motion of contact 98 to a ratchet 104 suitably connected to spindle 96. This spindle 96 can, however, be rotated in direct synchronism with the rotation of rolls 22.

In the operation of the modification shown in Figs. 2 to 4, support 28 is reciprocated in the same manner as described in connection with the discussion of Fig. 1 above. As this support 28 moves back and forth, the cam follower 73 rides on cam track 76, thus opening nozzle 26 during the intermediate portions of the stroke and closing the nozzle during the left-hand and right-hand ends of the stroke. During those times when too much liquid exists in the liquid-holding space, it may energize the indicating means, as previously discussed, and this indicating means can actuate the adjusting means 78 to cause the cam plate 74 to be lowered, thus rotating arm 72 to close nozzle 26 during the whole travel thereof. Equally, adjusting means 78 can lower cam plate 74 sufficiently so that the flow of liquid from the nozzle is reduced but not completely cut off. The flexible connection 75, between the two portions 72a and 72b of arm 72, allows additional travel of the cam follower 73 even after the nozzle 26 has been closed and thus prevents damage to arm 72. Equally, cam track 76 may be so arranged that cam follower 73 travels along different paths on the two strokes, one path permitting flow and the other path stopping flow of liquid.

As the nozzle 26 reaches the left-hand end of the stroke, it is moved across the wiping surface 92, thus wiping off any excess liquid existing thereon. At this time, lug 100 strikes the lever 98 which, through linkage 102, turns ratchet 104 a partial revolution, thus moving the wiping strip 92.

Figure 5:
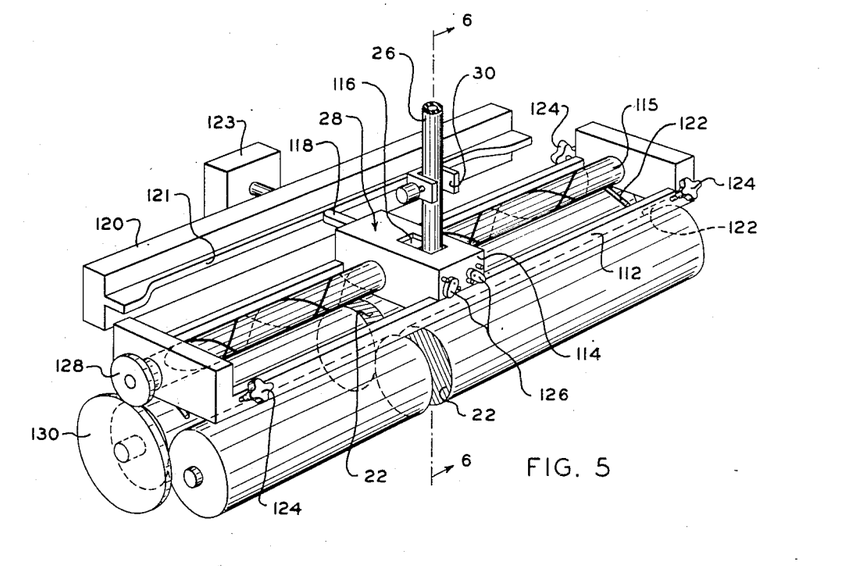
Fig. 5 is a fragmentary diagrammatic perspective view of still another modification of the invention.
Figure 6:
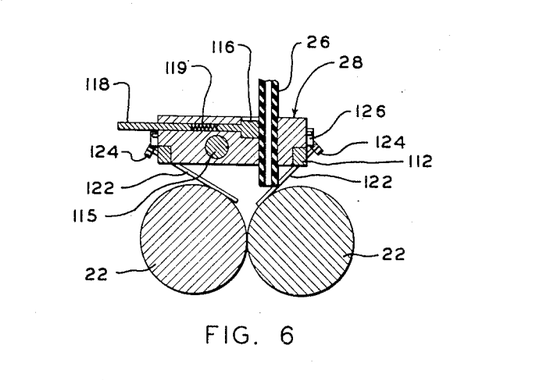
Fig. 6 is a fragmentary sectional view of Fig. 5 taken along plane 6—6.

Referring now to Figs. 5 and 6, there is shown another form of the invention wherein like numbers refer to like elements in the other figures. In this modification of the invention the reciprocating means comprises a double spiral shaft, the indicating means are somewhat modified and the nozzle is supported so as to discharge liquid therefrom to one surface of one of the sheets prior to its movement adjacent the liquid-holding space. In these figures, 28 represents the means for supporting the nozzle 26, this means preferably comprising a block 114 carried by a pair of track members 112, whose ends are connected together by means of plates 110. This block 114 is reciprocated by a double spiral shaft 115 running through block 114. The spiral shaft 115 is suitably driven by means such as a gear train comprising two gears 128 and 130, one of these gears being preferably connected to a drive for the rolls 22, while the other is preferably connected to shaft 115 so that shaft 115 is rotated in synchronism with, but at higher speed than rolls 22. In a preferred form of the invention, gear train 128—130 may be made variable so as to adjust the speed with which the block 114 is moved back and forth across the sheets. There is also provided an indicating means which measures excess liquid in the liquid-holding space. This means is shown in a preferred form as comprising a pair of shafts 122 rotatably supported by tracks 112. On the outer ends of shafts 122 are preferably provided ratchets which are adapted to be engaged by means such as pawls 126 carried by block 114, the pawls engaging ratchets 124 at each end of the stroke of block 114. Thus the ratchets 124 are gradually rotated, rotating shafts 122 and causing a wiping of these shafts against the sheets being fed past the rollers so as to remove excess liquid that might otherwise adhere to the surface of these shafts 122.

As one means for controlling the flow of liquid from the nozzle 26, there is also preferably provided a cam plate schematically indicated at 120. Block 114 preferably includes a pressure plate 116 and an actuating lever 118 similar in function to those previously described in connection with Fig. 2. Lever 118 bears upon a cam surface 121, carried by cam plate 120, and moves in and out of the block 114 under the control of the cam surface 121. Lever 118 preferably includes a strong spring 119 (Fig. 6) positioned between the outer end of lever 118 and pressure plate 116, this spring being similar in function to spring 75 of Fig. 3. There is also preferably included a means for adjusting the position of the cam plate with respect to the shaft 115, this means being indicated at 123 and comprising a solenoid or other regulating means.

As explained in connection with the other figures, the indicating means, comprising contacts 122, preferably are rendered operative to control the flow of liquid whenever the liquid in the liquid-holding space reaches a point where it shorts out either pair of contacts. In the modification shown in Fig. 5, this stoppage of flow of the liquid may be accomplished by having the indicating means actuate means 123 to move the cam plate 120 nearer block 114, thus moving actuating lever 118 inwardly to compress the nozzle 26 and thus stop further flow of the liquid. Equally, the indicating means may operate to close valve 30 or it can disengage a clutch suitably positioned in the means for driving shaft 115 when the block 114 is at one end or another of its stroke, that is, at a time when the cam plate normally closes the nozzle 26. The valve 30 is normally deenergized when rolls 22 are not rotating, thereby preventing flow of liquid when rolls 22 are still.

In the above modifications of the invention, the various rolls are suitably driven such as by means of a hand crank, an electric or spring motor, or by other suitable arrangements. It is equally possible, but less preferred, to have the movement of one of sheets 16, 20 move rolls 22. Thus a portion of one or both of these sheets extending from the camera may be grasped, thereby rotating rolls 22 and causing, through a suitable drive, the reciprocation of nozzle 26.

While a preferred superimposing means has been shown as comprising a pair of rolls, there may be provided other superimposing surfaces such as curved plates, a roll and a plate, or bars which are nonrotatable. Each of the guiding, propelling, superimposing and spreading functions of the rolls may be performed by separate means. Equally, the plane of superimposition of the two sheets may be varied from the vertical shown. It can, for example, be horizontal or can extend upwardly to a certain extent in those cases where the liquid has sufficiently high viscosity to be carried upwardly by one of the sheets after application to this sheet.

While preferred control circuits have been shown, mechanical and pneumatic equivalents thereof may be employed without departing from the scope of the invention. In the various forms of the invention, various portions of the devices shown are suitably hingedly or removably mounted to facilitate loading thereof, and suitable light seals are provided where necessary to prevent fogging of the photosensitive materials employed.

While a preferred use of the apparatus has been described above wherein the processing liquid is spread between the surface of the photosensitive sheet and a second surface moving at the same rate of speed as the photosensitive surface, other uses thereof are feasible in those cases where the photosensitive sheet 16 is the only sheet passing between the rolls 22 and the liquid need only be spread in contact with the photosensitive sheet. In order that the apparatus may be so used, the back roll 22 preferably has a surface to which the processing liquid does not readily adhere and which is inert to the processing liquid. This surface may be polished stainless steel, or an alkali-inert smooth plastic. In this case the rolls are spaced a sufficient distance apart so that a liquid-receiving space exists between the surface of the photosensitive sheet 16 and the back roll 22. The liquid is thus fed into, or carried into, the liquid-holding space defined on the one hand by the surface of the photosensitive sheet and on the other hand by the back roll 22. As the photosensitive sheet moves past this liquid-holding space, a thin layer of the liquid is applied to the surface thereof and the layer of liquid adheres to, or is absorbed by, the surface of the photosensitive film and accomplishes the desired processing. If desired, the apparatus may be modified for such alternative use by providing a drum or belt in place of the back roll 22, the surface of the drum or belt being preferably moved at the same rate of speed as the photosensitive sheet.

The various portions of the camera are made of metal, plastics, wood, and other materials normally employed for camera manufacture. The container 24 and nozzle 26 are preferably integrally formed of an alkali-inert plastic such as polyvinyl butyral, plasticized ethyl cellulose, methyl methacrylate, polyvinyl chloride, polyvinylidene chloride copolymers or other suitable plastics.

When the apparatus is used for photocopying and a positive silver image is to be made with the above-described apparatus, the photosensitive layer 16 is preferably a silver halide, and in particular a silver bromide or chloride such as "Contrast Process Ortho" or "Koda-bromide." In such a case the image-carrying layer 20 may comprise a sheet of baryta paper and the liquid 25 may comprise a solution of a developer and a silver halide solvent, said liquid being preferably quite viscous and quite alkaline. When such a layer of liquid is spread between the exposed photosensitive emulsion and the image-carrying sheet, it preferably bonds these sheets together, develops the latent negative image and, concurrently therewith, forms a positive image on the surface of the image-carrying sheet. Such a processing may be accomplished in a time ranging anywhere from 5 seconds to somewhat more than 1 minute, depending upon the constituents of the liquid and the type of silver halide emulsion employed. At the end of the processing period the negative image is preferably separated from the positive image by a suitable means and the final positive is fed from the apparatus through a suitable opening therefrom. One such preferred liquid contains the ingredients listed in the following example:

*Example 1*

1860 cc. of water
93 grams of sodium carboxymethyl cellulose
78 grams of sodium sulfite
74.6 grams of sodium hydroxide
14.5 grams of sodium thiosulfate
38.5 grams of citric acid
52 grams of hydroquinone While a preferred processing liquid and process have been described, numerous other modifications thereof are feasible. The liquid may comprise only a portion of the reactive ingredients and other portions thereof may be included in solid form in one or both of the two sheets. Equally, the process may comprise only the development, or development and fixation, of the negative. Similarly, other photosensitive materials such as diazonium compounds, ferric salts, dichromated colloids, etc., may be employed, the liquid being capable of accomplishing a predetermined processing thereof, as set forth in my copending application Serial No. 729,578, filed February 19, 1947.

The photosensitive material may have a "speed" ranging from the very fast films to the slowest, and its spectral response may vary from radium and X-rays to infrared rays. Copies may be made of books, images on television and other cathode ray screens, instrument panels, moving picture film, X-ray images, microscope images, and any other images, a copy of which is desired.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A photographic apparatus for exposing a photosensitive sheet and accomplishing a predetermined processing of said exposed photosensitive sheet, which sheet includes a layer of photosensitive material at least as a stratum thereof, by providing between said sheet and another sheet a layer of liquid capable of accomplishing said processing, said apparatus comprising means for positioning a supply of said photosensitive sheet, means for positioning a supply of said other sheet, superimposing means comprising a pair of pressure-applying members having surfaces between which and with respect to which said sheets are adapted to move in superimposed relation with a liquid-receiving space therebetween, means providing at least an exposure area for exposure of said photosensitive sheet at some point in its passage from its respective supply to said superimposing means, means for supporting a discharge nozzle through which said liquid may be fed to said sheets, means for reciprocating said nozzle in a direction transversely of the movement of said sheets, said means for reciprocating and supporting said nozzle locating the same throughout its travel substantially over the superposing means, and means for controlling the flow of liquid from said nozzle.

2. A photographic apparatus for exposing a photosensitive sheet and accomplishing a predetermined processing of said exposed photosensitive sheet, which sheet includes a layer of photosensitive material at least as a stratum thereof, by providing between said sheet and another sheet a layer of liquid capable of accomplishing said processing, said apparatus comprising means for positioning a supply of said photosensitive sheet, means for positioning a supply of said other sheet, superimposing means comprising a pair of surfaces between which and with respect to which said sheets are adapted to move in superimposed relation with a liquid-receiving space therebetween, means providing at least an exposure area for exposure of said photosensitive sheet at some point in its passage from its respective supply to said superimposing means, means for supporting a discharge nozzle through which said liquid may be fed to said sheets, means for reciprocating said nozzle in a direction transversely of the movement of said sheets, means for controlling the flow of liquid from said nozzle, liquid-gauging means rendered operative by a predetermined quantity of liquid adjacent said superimposing means, and means operatively connecting said liquid-gauging means and said liquid flow-controlling means to decrease the amount of liquid flow when said predetermined quantity of liquid is adjacent said superimposing means.

3. A photographic apparatus for exposing a photosensitive sheet and accomplishing a predetermined processing of said exposed photosensitive sheet, which sheet includes a layer of photosensitive material at least as a stratum thereof, by providing between said sheet and another sheet a layer of liquid capable of accomplishing said processing, said apparatus comprising means for positioning a supply of said photosensitive sheet, means for positioning a supply of said other sheet, superimposing means comprising a pair of surfaces between which and with respect to which said sheets are adapted to move in superimposed relation with a liquid-receiving space therebetween, means providing at least an exposure area for exposure of said photosensitive sheet at some point in its passage from its respective supply to said superimposing means, means for supporting a discharge nozzle through which said liquid may be fed to said sheets, means for reciprocating said nozzle in a direction transversely of the movement of said sheets, means for controlling the flow of liquid from said nozzle, said superimposing means bringing said sheets into superimposition along converging paths to provide a liquid-holding space adjacent said liquid-receiving space, and means rendering said liquid flow-controlling means operative to reduce flow of said liquid at predetermined portions of the stroke of said nozzle, said last-named means being adjusted so that the amount of liquid deposited at each stroke of said nozzle is sufficient to maintain said liquid-holding space filled to a predetermined level.

4. A photographic apparatus for exposing a photosensitive sheet and accomplishing a predetermined processing of said exposed photosensitive sheet, which sheet includes a layer of photosensitive material at least as a stratum thereof, by providing between said sheet and another sheet a layer of liquid capable of accomplishing said processing, said apparatus comprising means for positioning a supply of said photosensitive sheet, means for positioning a supply of said other sheet, superimposing means comprising a pair of surfaces between which and with respect to which said sheets are adapted to move in superimposed relation with a liquid-receiving space therebetween, means providing at least an exposure area for exposure of said photosensitive sheet at some point in its passage from its respective supply to said superimposing means, means for supporting a discharge nozzle through which said liquid may be fed to said sheets, means for reciprocating said nozzle in a direction transversely of the movement of said sheets, means for controlling the flow of liquid from said nozzle, and liquid-gauging means rendered operative by a predetermined quantity of liquid adjacent said superimposing means, said superimposing means bringing said sheets into superimposition along converging paths to provide a V-shaped liquid-holding space between said converging sheets, the flow of liquid from said nozzle being adjusted so that the amount of liquid deposited on at least one of said sheets by said nozzle is sufficient to maintain said liquid-holding space filled at least to a predetermined level, said liquid-gauging means being positioned adjacent the marginal ends of said liquid-holding space, said liquid-gauging means being operatively connected to said flow-controlling means for rendering said flow-controlling means operative to reduce flow of said liquid when said liquid-holding space is filled a predetermined amount above said level.

5. A photographic apparatus for exposing a photosensitive sheet and accomplishing a predetermined processing of said exposed photosensitive sheet, which sheet includes a layer of photosensitive material at least as a stratum thereof, by providing between said sheet and another sheet a layer of liquid capable of accomplishing said processing, said apparatus comprising means for positioning a supply of said photosensitive sheet, means for positioning a supply of said other sheet, superimposing means comprising a pair of surfaces between which and with respect to which said sheets are adapted to move in superimposed relation with a liquid-receiving space therebetween, means providing at least an exposure area for exposure of said photosensitive sheet at some point in its passage from its respective supply to said superimposing means, means for supporting a discharge nozzle through which said liquid may be fed to said sheets, means for reciprocating said nozzle in timed relation to the movement of said sheets, means for controlling the flow of liquid from said nozzle, and liquid-gauging means rendered operative by a predetermined quantity of liquid adjacent said superimposing means, said superimposing means bringing said sheets into superimposition along converging paths to provide a V-shaped liquid-holding space between said converging sheets, the speed of movement of said nozzle and the flow of liquid therefrom being adjusted so that the amount of liquid deposited on at least one of said sheets by said nozzle is sufficient to maintain said liquid-holding space filled at least to a predetermined level, said liquid-gauging means being positioned adjacent the marginal ends of said liquid-holding space and being so related to said space that liquid tending to flow beyond said ends of said space renders said liquid-gauging means operative.

6. A photographic apparatus for accomplishing a predetermined processing of a photosensitive sheet, which sheet includes a layer of photosensitive material at least as a stratum thereof, by providing between said sheet and another sheet a layer of liquid capable of accomplishing said processing, said apparatus comprising means for positioning a supply of said photosensitive sheet, means for positioning a supply of said other sheet, superimposing means comprising a pair of pressure-applying members having a pair of converging surfaces between which and with respect to which said sheets are adapted to move in superimposed relation with a liquid-receiving space therebetween, means mounted for reciprocal movement transversely of said sheets for applying said liquid to the surface of one of said sheets in a zigzag ribbon having a depth greater than the thickness of said liquid-receiving space, said superimposing means being capable of spreading said liquid to a thickness equal to said thickness of said liquid-receiving space between said sheets as said sheets are superimposed, and means for moving said liquid-applying means transversely of said surface of said sheet so as to maintain a supply of said liquid adjacent said converging surfaces of said superimposing means.

7. A photographic apparatus for accomplishing a predetermined processing of a photosensitive sheet, which sheet includes a layer of photosensitive material at least as a stratum thereof, by providing between said sheet and another sheet a layer of liquid capable of accomplishing said processing, said apparatus comprising means for positioning a supply of said photosensitive sheet, means for positioning a supply of said other sheet, superimposing means comprising a pair of pressure-applying members having a pair of surfaces between which and with respect to which said sheets are adapted to move in superimposed relation with a liquid-receiving space therebetween, means for supporting a discharge nozzle through which said liquid may be fed to a liquid-holding space defined by said sheets, means for controlling flow of said liquid from said nozzle to said liquid-holding space, means for gauging the amount of liquid in said liquid-holding space, means for reciprocating said nozzle, means for controlling the speed of movement of said nozzle during at least a part of the travel thereof, means for controlling the frequency of reciprocation of said nozzle, and an operative connection from said gauging means for rendering one of said three last-named means effective to prevent flow of liquid when said space contains more than a predetermined amount of liquid.

8. A photographic apparatus for accomplishing a predetermined processing of a photosensitive sheet, which sheet includes a layer of photosensitive material at least as a stratum thereof, by providing between said sheet and another sheet a layer of liquid capable of accomplishing said processing, said apparatus comprising means for positioning a supply of said photosensitive sheet, means for positioning a supply of said other sheet, superimposing means comprising a pair of pressure-applying members having a pair of surfaces between which and with respect to which said sheets are adapted to move in superimposed relation with a liquid-receiving space therebetween, means for supporting a discharge nozzle through which said liquid may be fed to at least one of said sheets, and means for moving said nozzle to and fro across said sheet at a higher speed than the speed of travel of said sheet past the plane of movement of said nozzle, said nozzle being located for movement over the pressure-applying members in a direction substantially parallel to said liquid-receiving space.

9. A photographic apparatus for exposing a photosensitive sheet and accomplishing a predetermined processing of said exposed photosensitive sheet, which sheet includes a layer of photosensitive material at least as a stratum thereof, by providing between said sheet and another sheet a layer of liquid capable of accomplishing said processing, said apparatus comprising means for positioning a supply of said photosensitive sheet, means for positioning a supply of said other sheet, superimposing means comprising a pair of surfaces between which and with respect to which said sheets are adapted to move in superimposed relation with a liquid-receiving space therebetween, means providing at least an exposure area for exposure of said photosensitive sheet at some point in its passage from its respective supply to said superimposing means, means for supporting a discharge nozzle through which said liquid may be fed to said sheets, means for reciprocating said nozzle in a direction transversely of the movement of said sheets, means for controlling the flow of liquid from said nozzle, said superimposing means bringing said sheets into superimposition along converging paths to provide a liquid-holding space adjacent said liquid-receiving space, and means for adjusting at least one of said reciprocating and controlling means to provide a total flow of liquid to said liquid-holding space substantially equal to the amount of liquid removed therefrom by said sheets as said sheets pass through said superimposing means.

10. A photographic apparatus for exposing a photosensitive sheet and accomplishing a predetermined processing of said exposed photosensitive sheet, which sheet includes a layer of photosensitive material at least as a stratum thereof, by providing between said sheet and another sheet a layer of liquid capable of accomplishing said processing, said apparatus comprising means for positioning a supply of said photosensitive sheet, means for positioning a supply of said other sheet, superimposing means comprising a pair of pressure-applying members having a pair of surfaces between which and with respect to which said sheets are adapted to move in superimposed relation with a liquid-receiving space therebetween, means providing at least an exposure area for exposure of said photosensitive sheet at some point in its passage from its respective supply to said superimposing means, means for applying said liquid unevenly to at least one of said sheets, and means for spreading said applied liquid evenly across the surface of one of said sheets, said applying means comprising a support for a nozzle from which said liquid is adapted to be discharged to said sheet, means for reciprocating said nozzle support transversely of said sheet, and means associated with said nozzle support for controlling flow of liquid from said nozzle.

11. A photographic apparatus for exposing a photosensitive sheet and accomplishing a predetermined processing of said exposed photosensitive sheet, which sheet includes a layer of photosensitive material at least as a stratum thereof, by providing between said sheet and another sheet a layer of liquid capable of accomplishing said processing, said apparatus comprising means for positioning a supply of said photosensitive sheet, means for positioning a supply of said other sheet, superimposing means comprising a pair of surfaces between which and with respect to which said sheets are adapted to move in superimposed relation with a liquid-receiving space therebetween, means providing at least an exposure area for exposure of said photosensitive sheet at some point in its passage from its respective supply to said superimposing means, said superimposing means comprising a pair of pressure rolls, and means for discharging liquid into the bite of said rolls, said last-named means comprising a nozzle and means for reciprocating said nozzle along the bite of said rolls.

12. A photographic apparatus for exposing a photosensitive sheet and accomplishing a predetermined processing of said exposed photosensitive sheet, which sheet includes a layer of photosensitive material at least as a stratum thereof, by providing between said sheet and another sheet a layer of liquid capable of accomplishing said processing, said apparatus comprising means for positioning a supply of said photosensitive sheet, means for positioning a supply of said other sheet, superimposing means comprising a pair of surfaces between which and with respect to which said sheets are adapted to move in superimposed relation with a liquid-receiving space therebetween, means providing at least an exposure area for exposure of said photosensitive sheet at some point in its passage from its respective supply to said superimposing means, said superimposing means comprising a pair of pressure rolls, means for discharging liquid onto the surface of at least one of said sheets passing over one of said rolls, means for reciprocating said discharge means across said surface of said sheet, means responsive to an exces of liquid on said sheet, and means operatively connecting said last-named means and said discharge means so as to render said discharge means effective to prevent discharge of said liquid when said excess of liquid exists on said sheet.

13. A photographic apparatus for exposing a photosensitive sheet and accomplishing a predetermined processing of said exposed photosensitive sheet, which sheet includes a layer of photosensitive material at least as a stratum thereof, by providing on a surface of said sheet a layer of liquid capable of accomplishing said processing, said apparatus comprising means for positioning a supply of said photosensitive sheet, means for guiding said photosensitive surface into superimposition with another surface with a liquid-receiving space therebetween, means for exposing said photosensitive sheet, means for moving said two surfaces at substantially the same speed, and mean for applying said liquid to the surface of aid sheet in spaced ribbons extending transversely of said surface of said sheet, each said ribbon having a depth greater than the thickness of said liquid-receiving space, said guiding means including a pair of pressure-applying members capable of spreading said liquid to a thickness equal to said thickness of said liquid-receiving space as said surfaces are superimposed.

14. A photographic apparatus for exposing a photosensitive sheet and accomplishing a predetermined processing of said exposed photosensitive sheet, which sheet includes a layer of photosensitive material at least as a stratum thereof, by providing on a surface of said sheet a layer of liquid capable of accomplishing said processing, said apparatus comprising means for positioning a supply of said photosensitive sheet, means for guiding said photosensitive surface into superimposition with another surface with a liquid-receiving space therebetween, means for exposing said photosensitive sheet, means for moving said two surfaces at substantially the same speed, means for holding said liquid under pressure, a nozzle for discharging said liquid, means for reciprocating said nozzle transversely of one of said surfaces adjacent said space, means for controlling flow of said liquid from said nozzle, and means rendering said flow-controlling means effective to prevent flow of said liquid from said nozzle at predetermined positions of said nozzle during its reciprocation.

15. A photographic apparatus for exposing a photosensitive sheet and accomplishing a predetermined processing of said exposed photosensitive sheet, which sheet includes a layer of photosensitive material at least as a stratum thereof, by providing on a surface of said sheet a layer of liquid capable of accomplishing said processing, said apparatus comprising means for positioning a supply of said photosensitive sheet, means for guiding said photosensitive surface into superimposition with another surface with a liquid-receiving space therebetween, means for exposing said photosensitive sheet, means for moving said two surfaces at substantially the same speed, means for holding said liquid under pressure, a nozzle for discharging said ilquid, means for reciprocating said nozzle transversely of one of said surfaces adjacent said space, means for controlling the flow of said liquid from said nozzle, means rendering said flow-controlling means effective to prevent flow of said liquid from said nozzle at predetermined positions of said nozzle during its reciprocation, and means for wiping excess liquid from said nozzle after flow of liquid therefrom has been prevented.

16. A photographic apparatus for exposing a photosensitive sheet and accomplishing a predetermined processing of said exposed photosensitive sheet, which sheet includes a layer of photosensitive material at least as a stratum thereof, by providing on a surface of said sheet a layer of liquid capable of accomplishing said processing, said apparatus comprising means for positioning a supply of said photosensitive sheet, means for guiding said photosensitive surface into superimposition with another surface with a liquid-receiving space therebetween, means for exposing said photosensitive sheet, means for moving said two surfaces at substantially the same speed, means for holding said liquid under pressure, a nozzle for discharging said liquid, means for reciprocating said nozzle transversely of one of said surfaces adjacent said space, means for controlling the flow of said liquid from said nozzle, means rendering said flow-controlling means effective to prevent flow of said liquid from said nozzle at predetermined positions of said nozzle during its reciprocation, means for wiping excess liquid from said nozzle after flow of liquid therefrom has been prevented, and means for moving said wiping means so as to present a fresh wiping surface to said nozzle.

17. A photographic apparatus for exposing a photosensitive sheet and accomplishing a predetermined processing of said exposed photosensitive sheet, which sheet includes a layer of photosensitive material at least as a stratum thereof, by providing on a surface of said sheet a layer of liquid capable of accomplishing said processing, said apparatus comprising means for positioning a supply of said photosensitive sheet, means for guiding said photosensitive surface into superimposition with another surface with a liquid-receiving space therebetween, means for exposing said photosensitive sheet, means for moving said two surfaces at substantially the same speed, means for supporting a nozzle through which said liquid may be discharged to one of said surfaces in a narrow stream, a nozzle compressing means, a track, a lever travelling in said track, said lever being connected to said supporting means for said nozzle, means for raising and lowering said track to move said lever with respect to said support, said lever being connected to said nozzle compressing means, and means for reciprocating said nozzle-supporting means so that said lever moves along said track.

18. A photographic apparatus for exposing a photosensitive sheet and accomplishing a predetermined processing of said exposed photosensitive sheet, which sheet includes a layer of photosensitive material at least as a stratum thereof, by providing on a surface of said sheet a layer of liquid capable of accomplishing said processing, said apparatus comprising means for positioning a supply of said photosensitive sheet, means for guiding said photosensitive surface into superimposition with another surface with a liquid-receiving space therebetween, means for exposing said photosensitive sheet, means for moving said two surfaces at substantially the same speed, means for supporting a nozzle through which said liquid may be discharged to one of said surfaces in a narrow stream, a nozzle compressing means, a cam, a lever travelling along said cam, said lever being connected to said supporting means for said nozzle, means for moving said cam to move said lever with respect to said support, said lever being connected to said nozzle compressing means, and means for reciprocating said nozzle-supporting means so that said lever moves along said cam.

19. A photographic apparatus for exposing a photosensitive sheet and accomplishing a predetermined processing of said exposed photosensitive sheet, which sheet includes a layer of photosensitive material at least as a stratum thereof, by providing on a surface of said sheet a layer of liquid capable of accomplishing said processing, said apparatus comprising means for positioning a supply of said photosensitive sheet, means for guiding said photosensitive surface into superimposition with another surface with a liquid-receiving space therebetween, means for exposing said photosensitive sheet, means for moving said two surfaces at substantially the same speed, means for supporting a nozzle through which said liquid may be discharged in a narrow stream to one of said surfaces, means for reciprocating said stream across said surface, a nozzle compressing means, a cam so mounted as to be located adjacent the path of travel of said stream across said surface and for so controlling the nozzle compressing means as to cut down the volume of said stream when said stream approaches each end of its reciprocal stroke, and an operative connection between said cam and said nozzle compressing means, said cam operating said nozzle compressing means through said operative connection.

20. A photographic apparatus for exposing a photosensitive sheet and accomplishing a predetermined processing of said exposed photosensitive sheet, which sheet includes a layer of photosensitive material at least as a stratum thereof, by providing on a surface of said sheet a layer of liquid capable of accomplishing said processing, said apparatus comprising means for positioning a supply of said photosensitive sheet, means for guiding said photosensitive surface into superimposition with another surface with a liquid-receiving space therebetween, means for exposing said photosensitive sheet, means for moving said two surfaces at substantially the same speed, means for supporting a nozzle through which said liquid may be discharged in a narrow stream to one of said surfaces, means for reciprocating said stream across said surface, a nozzle compressing means, a cam for operating said nozzle compressing means, means for gauging the amount of liquid discharged onto said surface, and an operative connection between said liquid-gauging means and said cam.

21. A photographic apparatus for exposing a photosensitive sheet and accomplishing a predetermined processing of said exposed photosensitive sheet, which sheet includes a layer of photosensitive material at least as a stratum thereof, by providing on a surface of said sheet a layer of liquid capable of accomplishing said processing, said apparatus comprising means for positioning a supply of said photosensitive sheet, means for guiding said photosensitive surface into superimposition with another surface with a liquid-receiving space therebetween, means for exposing said photosensitive sheet, means for moving said two surfaces at substantially the same speed, means for supporting a nozzle through which said liquid may be discharged in a narrow stream, means for reciprocating said nozzle transversely of at least one of said surfaces to apply a stream of said liquid transversely to said surface, means for controlling the flow of said liquid, and means for adjusting one of said two last-named means so that the stream of fed liquid contains sufficient liquid only to cover a predetermined area of said sheet to a predetermined depth, said area having a dimension longitudinal of said sheet less than the transverse travel of said nozzle, said adjusting means being arranged to permit further feed of said liquid before the next succeeding area of said sheet passes said nozzle.

22. A photographic apparatus for exposing a photosensitive sheet and accomplishing a predetermined processing of said exposed photosensitive sheet, which sheet includes a layer of photosensitive material at least as a stratum thereof, by providing on a surface of said sheet a layer of liquid capable of accomplishing said processing, said apparatus comprising means for positioning a supply of said photosensitive sheet, means for guiding said photosensitive surface into superimposition with another surface with a liquid-receiving space therebetween, means for exposing said photosensitive sheet, means for moving said two surfaces at substantially the same speed, means for supporting a nozzle through which said liquid may be discharged in a narrow stream, means for gauging the amount of said liquid existing adjacent said liquid-receiving space, means for moving said nozzle back and forth across at least one of said surfaces, and means for preventing flow of liquid from said nozzle at the end of its back and forth path of movement, said last-named means being adjustable to control flow of liquid during intermediate portions of movement of said nozzle along said path, said gauging means being operatively connected to said flow-preventing means for rendering said preventing means effective to prevent flow of liquid during movement of said nozzle along said whole path.

23. A photographic apparatus for accomplishing a predetermined processing of an exposed photosensitive sheet, which sheet includes a layer of photosensitive material at least as a stratum thereof, by providing on a surface of said sheet a layer of liquid capable of accomplishing said processing, said apparatus comprising means for positioning a supply of said photosensitive sheet, a pair of rolls through which said photosensitive sheet is adapted to be moved with a liquid-receiving space between one surface of said photosensitive sheet and one of said rolls, means for supporting a nozzle through which said liquid may be discharged in a narrow stream, means for reciprocating said nozzle along a path substantially parallel to the axes of said rolls, said nozzle-supporting means being arranged to position said nozzle so that it discharges said liquid towards said rolls, and means for controlling the flow of said liquid from said nozzle.

EDWIN H. LAND.

REFERENCES CITED

The following references are of record in the file of this patent:

UNITED STATES PATENTS

| Number | Name | Date |
|---|---|---|
| 2,476,007 | Tuttle | July 12, 1949 |